United States Patent [19]

Baker

[11] 4,039,909
[45] Aug. 2, 1977

[54] VARIABLE SPEED ELECTRONIC MOTOR AND THE LIKE

[75] Inventor: Richard H. Baker, Bedford, Mass.

[73] Assignee: Massachusetts Institute of Technology, Cambridge, Mass.

[21] Appl. No.: 548,493

[22] Filed: Feb. 10, 1975

[51] Int. Cl.² ............................................ H02P 7/36
[52] U.S. Cl. .................................. 318/197; 318/187; 318/237
[58] Field of Search ............... 318/197, 277, 230, 231, 318/237, 187

[56] References Cited
U.S. PATENT DOCUMENTS

| | | | |
|---|---|---|---|
| 3,448,363 | 6/1969 | Pierro et al. | 318/197 |
| 3,506,900 | 4/1970 | Neuffer et al. | 318/237 |
| 3,611,082 | 10/1971 | Schmitz | 318/197 X |
| 3,686,548 | 8/1972 | Onoda et al. | 318/197 X |

Primary Examiner—Gene Z. Rubinson

Attorney, Agent, or Firm—Arthur A. Smith, Jr.; Robert Shaw; Martin M. Santa

[57] ABSTRACT

A variable speed electronic motor having wound polyphase armature and field windings each of which is energized by a polyphase source whose voltage and frequency are variable in a controlled fashion. Provision is made to control the excitation of the armature and field windings so that the torque output is optimized for all loads and speeds. Also, the machine disclosed can be made to function in a generating mode; hence, there can be flow of both electrical and mechanical energy to and from the machine and the amount of each can be carefully regulated. In addition, a variation of the machine, acting purely in a generating mode, can be programmed to regulate electrical output of the machine independent of the angular velocity of the machine, and output power can be similarly regulated, all within reasonable limits. Also, for some requirements one winding can be energized at a constant frequency and voltage and the other can be excited at variable frequency and voltage.

31 Claims, 9 Drawing Figures

|  |  | Reverse Full Speed | Reverse 1/2 Speed | Stopped | Forward 1/2 Speed | Forward Full Speed |
|---|---|---|---|---|---|---|
| Option A | Stator Field | ↻ | ↶ | ← Non-Rotating | ↺ $P_s = 1/2\,P_0$ | ↺ $P_s \approx 1/2\,P_0$ |
| Option A | Rotor Field | ↻ | ↻ | ← Non-Rotating | ↻ $P_r = 1/2\,P_0$ | ↻ $P_r \approx 1/2\,P_0$ |
| Option B | Stator Field |  |  | ↻ CW | ↺ $P_s = P_0$ |  |
| Option B | Rotor Field |  |  | ↻ CW | ← $P_r = 0$ |  |
| Option C | Stator Field |  |  | ↺ CCW | ← $P_s = 0$ |  |
| Option C | Rotor Field |  | ↺ | ↺ CCW | ↻ $P_r = 1/2\,P_0$ |  |
| Remarks |  | $P_s = P_r = 1/2\,P_0$ | $P_s + P_r = 0$ | $P_s \approx P_r \approx 0$ | $P_s + P_r = P_0$ | $P_s = P_r = 1/2\,P_0$ |

Key Symbols

← non-rotating field

↶ field rotating 1/2 maximum rate

↺ field rotating maximum rate

Key $P_s \equiv P_{stator}$
$P_r \equiv P_{rotor}$
$P_0 = P_m + \text{Losses}$
$P_m \equiv P_{mechanical}$ Key Equations $$\frac{P_m}{\omega_m} = \frac{P_s}{\omega_s} = \frac{P_r}{\omega_r}$$

$$\omega_m = \omega_s + \omega_r$$

FIG. 2

| | Stop | 1/8 F.S. | 2/8 F.S. | 3/8 F.S. | 4/8 F.S. | 5/8 F.S. | 6/8 F.S. | 7/8 F.S. | 8/8 F.S. |
|---|---|---|---|---|---|---|---|---|---|
| stator voltage | 1/4 E | 1/2 E | 3/4 E | E | E | E | E | E | E |
| stator frequency | ↺ | ↺ | ↺ | ↺ | ↺ | ↺ | ↺ | ↺ | ↺ |
| rotor frequency | ↺ | ↺ | ↺ | ↺ | ← | ↺ | ↺ | ↺ | ↺ |
| rotor voltage | 1/4 V | 1/4 V | 1/4 V | 1/4 V | 1/8 V | 1/4 V | 1/2 V | 3/4 V | V |
FIG. 7A
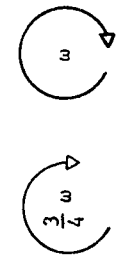
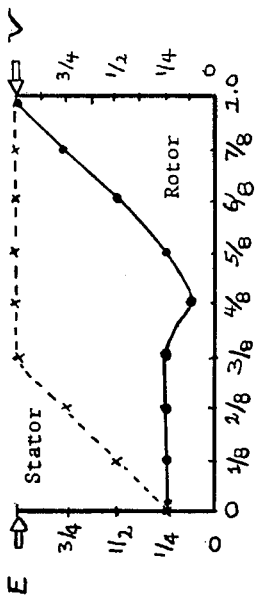
FIG. 7B
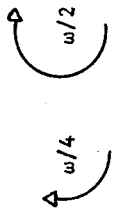
F.S. = Full speed

VARIABLE SPEED ELECTRONIC MOTOR AND THE LIKE

The present invention relates to electronic motors and the like wherein both the armature and the field of the machine are energized by variable voltage, variable frequency, polyphase electric energy, as well as to rotating electronic machines wherein only one machine element is so energized.

Attention is called to the following U.S. Letters Pat. and applicatiions therefor: U.S. Pat. No. 3,748,492 (Baker); U.S. Pat. No. 3,742,265 (Smith, Jr.); U.S. Pat. No. 3,866,060 (Bannister et al); U.S. Pat. No. 3,867,643 (Baker et al); Ser. No. 360,501, filed May 15, 1973, (Baker, now U.S. Pat. No. 3,899,689 ); Ser. No. 508,293, filed Sept. 23, 1974 (Bannister et al now Pat. No. 3,983,503 ); Ser. No. 515,284, filed Oct. 16, 1974, (Baker now U.S. Pat. No. 3,942,028 Ser. No. 515,290, filed Oct. 16, 1974 (Baker, now Pat. No. 3,909,685 et al). The following application for Letters Patent that accompanies herewith is hereby incorporated herein by reference; "Electric Power Supply" (Baker), Ser. No. 548,840, filed Feb. 10, 1975, now Pat. No. 3,971,976.

Although the present inventive concepts have wider use than in connection with variable speed drives for electric automobiles and like electric vehicles, most of the present specification is directed to such use. The broader implications of the invention will be appreciated by workers skilled in the art to which the invention pertains, in the light of the explication herein. In the electric vehicle use, as later discussed, the machine disclosed can perform both a motor or drive functions as well as a generating function. The latter aspect of the invention also has broad implications which are explored to some extent.

The performance of electric vehicles is battery limited. The battery energy density is insufficient for good range and the power density is inadequate for good performance. Consequently, it is important to: (1) maximize the battery-to-total-vehicle weight, (2) use the battery energy as efficiently as possible, and (3) recover as much of the vehicle's kinetic energy as is possible through regenerative braking.

An electric vehicle must have a drive system that can produce both variable speeds and high torques. Especially needed is high torque at low speed for starting on a steep incline and for hill climbing. Also, short periods of high torque at high speed are required for passing.

The DC motor has long been the workhorse of electrical propulsion. Its high starting torque and relative ease of control adapted it well to meet variable speed drive requirements. Unfortunately, these advantages are accompanied by several disadvantages, most notable of which are the relatively large size per unit power output and the maintenance requirement of the commutator.

The commutator places a restriction on the use of DC machines in general. These machines must be operated at speeds limited by the mechanical stresses imposed on the rotating commutator structure. This structure, being circumferentially segmented, does not lend itself well to high speed design in large machines. Where weight is at a premium, the ability to achieve a given power at high shaft speeds is desirable.

Conventional AC machines are not particularly well suited to uses requiring high starting torque and efficient speed control. Synchronous machines have been used but the AC controllers are complex and inefficient and limited range cycloconverters. Induction machines have been used with rotor resistance control but the method is also inefficient and results in a maxmium starting torque of only about three times rated full speed torque.

The power required to accelerate a 3000 pound car at an initial rate of 10 ft/sec$^2$ (typical of a Volkswagon's acceleration) is about 20 kW. This same power, at much less torque is required to maintain a cruising speed of 55 mph. (Beachley, N. H. and A. A. Frank, "Electric and Electric-hybrid Cars -- Evaluation and Comparison,"- S.A.E. Special Publication Sp-379, p. 28.) Using a conventional induction motor with rotor resistor speed control, the maximum stall torque is approximately three times rated, full load torque. Therefore to obtain the desired starting torque, it is necessary that the motor be over-designed with respect to full load, or cruising, requirements.

The power conditioner described herein, together with a doubly excited wound rotor synchronous-induction machine, forms a tractive system which overcomes the limitation encountered by both DC and conventionally controlled AC systems. The electronic motor of the present invention can produce very high stall torques as well as high torques at high or low speed operation under cruise conditions to permit a substantial reduction in weight over existing DC (or AC) machines of comparable power.

Another serious problem which up to now has been common to both DC and AC vehicle drive systems, is that the controller for either system uses a pulse format: pulse modulation is undesirable because when a given amount of charge per unit time is drawn from a chemical battery in the form of pulses the system loss ($I^2$loss) is increased over what it would be if the charge were removed at a constant rate. In place of the pulse width modulation, which is inefficent and causes undue battery heating and shorter battery life, the present power controller conditions the power requirements of the motor such that a steady current flow is demanded; this method of operation minimizes the peak-to-average current drain for the batteries to give a better impedance match between the batteries and the motor over the entire speed range. The present invention greatly increases power density available from the battery which gives higher starting torque and available energy density which gives greater range.

The control system herein disclosed uses two separate inventers also called 3-v-f inverters herein, one to energize the stator winding and one to energize the rotor winding of a synchronous-induction machine. The control system allows a synchronous-induction machine to develop high torque like a DC machine but without a commutator. The control system makes it possible to use a synchronous-induction motor efficiently from stall-to-maximum speed and, in addition, the motor can be used for regenerative braking.

It is therefore, a principal object of the present invention to provide a variable speed electronic motor system that is particularly useful as the driving mechanism for electric vehicles but can be used to power boats, elevators, etc.

A further object is to provide a variable speed electronic motor fo more general use.

A still further object is to provide a rotating polyphase electric machine wherein both the armature and the field thereof contain polyphase windings and in which the windings are independently energized from polyphase sources to permit independent control of the magnetic fields of each.

Another object is to provide an electronic rotating machine of more general nature.

These and still further objects are addressed in the description that follows and are more particularly delineated in the appended claims.

The invention is hereinafter described with reference to the accompanying drawing in which:

FIG. 2 is a control chart for the machine of FIG. 1;

FIG. 7A is a table showing stator and rotor magnetic fields, frequencies and rotational sense for various speed settings of a machine of the type depicted in FIG. 1; and FIG. 7B is a graph showing corresponding stator and rotor voltages at various speeds for a rotating machine of the type depicted in FIG. 1.

In the explanation that follows, there is first given a brief overall description of the apparatus of the invention to identify the working parts thereof in a general way; the brief explanation is followed by a discussion of the underlying theory; and finally, the mechanism to perform the necessary functions is discussed in detail. The system described can perform purely motor or drive functions, motor and generator functions, and purely generator functions.

Figure 1:
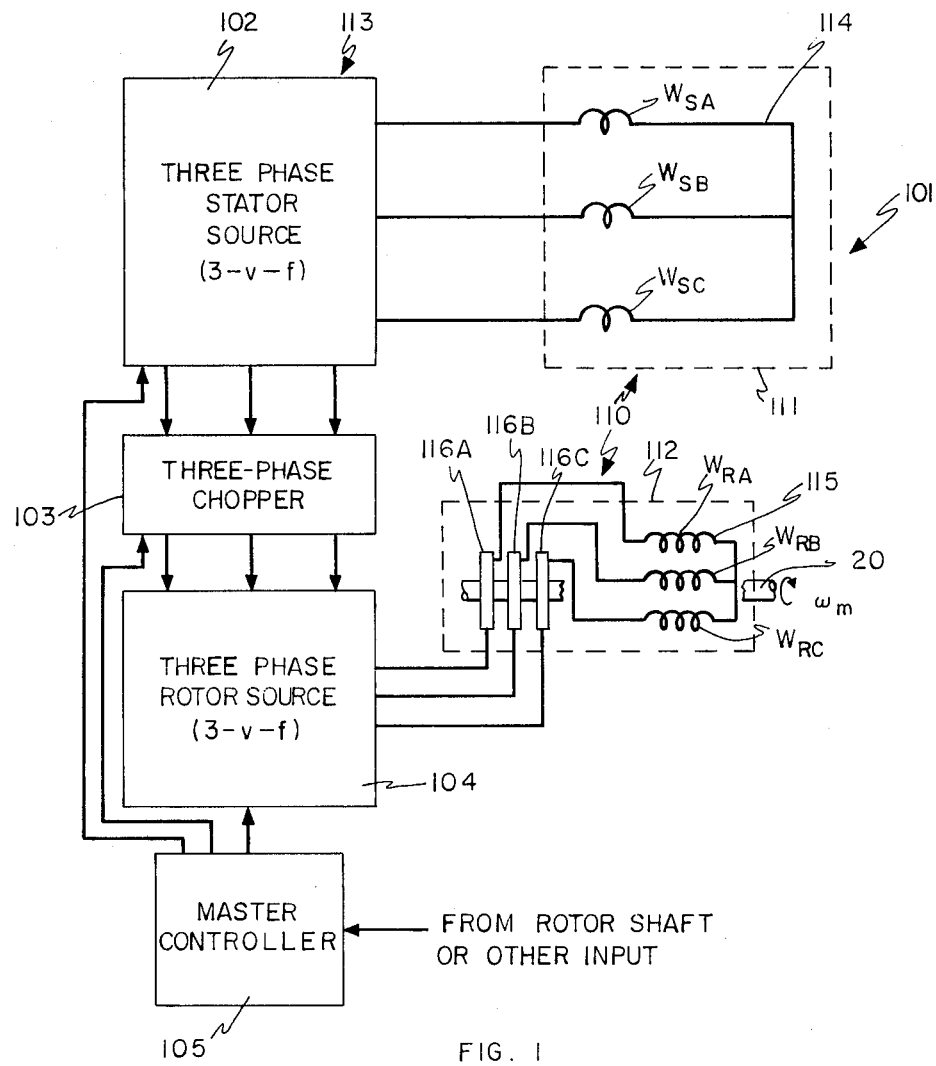
FIG. 1 is a schematic circuit diagram, partly block diagram in form, of a machine having a wound polyphase armature winding and a wound polyphase field winding, each of which is independently energized by a variable voltage, variable frequency polyphase source (also called 3-v-f herein)

With reference now to FIG. 1, the apparatus shown at 101 is an electronic motor which, as later explained, can also act as a generator -- but first the motor function. The electronic motor 101 includes a motor portion 110 that comprises a stator 111 and a rotor 112, and a control portion 113 that includes a three-phase stator source 102 (also called a first polyphase source herein), a three-phase rotor source 104 (also called second polyphase source herein), a three-phase chopper 103 between the two sources and a master controller 105. The sources 102 and 104 are variable voltage, variable frequency (3-v-f) sources which can be like those described in said application No. 515,290 or those described in said accompanying application entitled "Electric Power Supply." The stator 111 comprises a stator winding 114 comprising phase coils $W_{SA}$, $W_{SB}$ and $W_{SC}$ to represent the three phases of a three-phase winding and a rotor winding 115 comprising phase coils $W_{RA}$, $W_{Rb}$ and $W_{RC}$ to which electrical connections are made from the 3-v-f 104 through slip rings 116A, 116B and 116C, respectively. The operation of the electronic motor is under the direction of the master controller 105 which acts to vary the voltage outputs and the frequency outputs of the polyphase 3-v-f sources 102 abd 104 as well as the relative electrical time phasing between the outputs of the two polyphase sources. In this connection, as discussed later, the relative rotating magnetic fields of the rotor and stator can both be made to rotate in the same direction or opposite directions or one can be made stationary in space, at any instant of time; frequency determines the relative rotatable velocities between the two, but sequencing determines the relative direction. Also, however, the relative position of the magnetic axes of the two magnetic fields at any instant of time is an important factor in establishing torque output of the electronic motor 101. Hence, the torque produced is a function of the excitation, i.e., the amplitude and time phase of the current flowing in the stator and the rotor windings and these are controlled by the stator and rotor power sources which are, in turn, controlled by the master controller 105.

Some general considerations are now explored for a threephase motor wherein both the stator or armature winding 114 and the rotor or field winding 115 are excited by variable voltage, variable frequency waveforms to give synchronous-induction motor characteristics that are uniquely suited to variable speed requirements. A brief discussion of a synchronous-induction machine follows, the machine discussed being one in which the mechanical axes of the rotor and the stator are concentric and in which the rotor is the inner element of a nested configuration.

All electric motors operate on the same principle, namely, the tendency of two magnets to align themselves. In general, then, electric motors have windings, one of which is free to rotate with respect to the other. Electromechanical energy conversion occurs in a magnetic field type converter whenever the stored magnetic energy changes with mechanical position. If no change in the magnetic field configuration occurs with a change in mechanical position, then there must be a change in the relative position of the current-carrying coils that make up each winding. Thus it is possible to build electromechanical energy converters with one or more current-carrying coils which are respectively excited from one or more independent sources. Torque is produced as a consequence of the tendency for two electromagnets to align in the same way that permanent magnets tend to align themselves.

In a three-phase rotating machine, the windings of the individual phases are displaced from each other by 120 electrical degrees in space around the air-gap circumference. When each phase is excited by an alternating current, the corresponding component MMF waves vary sinusoidally with time. Each component can be expressed by an oscillating space vector drawn along the magnetic axis and the resultant MME is the sum of the components from all three phases.

From a magnetic field point of view, the currents in the windings create magnetic flux in the air-gap between the stator and rotor where the flux path is completed through the stator and rotor iron. Torque, which is produced by the efforts of the magnetic axes of the two fields to align themselves, is proportional to the product of the amplitudes of the stator and rotor MMF and is further proportional to the angle between their magnetic axes.

A single-phase synchronous machine has one phase-winding, usually on the stator, and a DC field winding (or a permanent magnet field), usually on the rotor. When the single-phase synchronous machine drives a load, the stator current induces an alternating voltage in the field circuit. Interaction between stator and rotor lead to an infinite sequence of even harmonics on the stator and an infinite sequence of odd harmonics on the rotor. As a consequence, the analysis of a single-phase synchronous machine is unduly complicated under load conditions, and, therefore, an equivalent two-phase machine with balanced loads on the two phases, is generally used in design analysis. This is because, under steady-state conditions with balanced loads, the stator-rotor interaction is eliminated and a steady-state equivalent circuit along with the steady-state torque can be easily determined In the design of rotating electromechanical energy convertes, the analysis of a two-phase sytem is most important. This is because of the fact that, regardless of the number of phases that an energy converter may have on its rotor and on its stator, the equations of motion can always be reduced to an equivalent two-phase system on the rotor and the stator for considerations of torque production.

A smooth air-gap, two-phase synchronous machine can have a single DC winding for the field on the rotor and a two-phase winding on the stator. The torque for a two-pole machine can be expressed as:

$$T = L_{sr} I_s I_r SIN\theta_m \tag{1}$$

wherein $L_{sr}$ is the stator-rotor mutual inductance
$I_s$ = steady-state stator current
$I_r$ = steady-state rotor current
$\theta_m$ = angle between the magnetic axis of the rotor and the stator fields A machine that is more interesting for variable speed electric drives is a synchronous-induction machine, or a doubly fed induction machine, wherein excitation at different frequencies is applied to both the stator winding and the rotor winding. In order to produce an output torque at frequency $\omega_m$, the stator and rotor windings must be excited with frequencies that have a sum or difference equal to $n$ times the mechanical speed, where $n$ is the number of pairs of poles:

$$\omega_s \pm \omega_r = n\omega_m \tag{2}$$

wherein $\omega_s$ is the angular velocity of the stator magnetic field, $\omega_r$ the angular velocity of the rotor magnetic field and $\omega_m$ is the angular velocity of the rotor, that is, the mechanical frequency.

Defining the ratio $\omega_r/\omega_s = s$, it can be shown (see D. C. White and H. H. Woodson, Electromechanical Energy Conversion, John Wiley & Sons, Inc., New York, N. Y., 1959, chapter three) that the torque T can be defined in terms of the stator air gap power as:

$$T = \frac{1-s}{\omega_m} [V_s I_s COS\theta_s - I_s^2 R_s] \tag{3}$$

and in terms of the rotor air-gap power as $$T = \frac{s-1}{s\omega_m} [V_r I_r COS\theta_r - I_r^2 R_r]. \tag{4}$$

At steady state, conservation of power demand that:

| Total power supplied to stator and rotor | = | mechanical power delivered | + | electrical losses and mechanical losses | (5) |

Neglecting mechanical friction and windage losses, equation (5) can be expressed as:

$$V_s I_s COS_s + V_r I_R COS_r = T_m + I_s^2 R_s + I_r^2 R_r \tag{6}$$

or $$T = \frac{1}{\omega_m} [V_s I_s COS\theta_s + V_r I_r COS\theta_r - I_s^2 R_s - I_r^2 R_r]. \tag{7}$$

Using equations (3), (4) and (7), it can be shown that $$\text{stator power} = T\frac{\omega_s}{n} = V_s I_s COS\theta_s - I_s^2 R_s \tag{8}$$

$$\text{mechanical power} = T\omega_r = (1\text{-}s)[V_s I_s COS\theta_s - I_s^2 R_s] \tag{9}$$

$$\text{rotor power} = T\frac{\omega_r}{n} = s[V_s I_s COS\theta_s - I_s^2 R_s] \tag{10}$$

The above expressions are interesting because they show that the torque of a synchronous-induction machine is like the torque of fluid coupling wherein the torque times the apparent mechanical speed is equal to the air-gap power as seen by a system moving at that speed. Viewed another way, $$\frac{\text{mechanical power}}{\omega_{mechanical}} = \frac{\text{stator power}}{\omega_{stator}} = \frac{\text{rotor power}}{\omega_{rotor}} \tag{11}$$

Equation (11) shows that the mechanical power is derived from both the stator excitation and the rotor excitation in relation to the frequency of those excitations. This recognition, as is shown in the next few paragraphs, makes possible some interesting new controls for variable speed-drive systems.

When the rotor of a standard three-phase induction motor is replaced by an energized three-phase wound rotor, it becomes a three-phase synchronous-induction machine. Further, when both the stator and rotor windings are excited independently by three-phase variable voltage, variable frequency (3-v-f) sources as discussed herein, then the machine can serve as a high torque motor that can operate efficiently over a speed range from stall to high speed. Also, when it is excited by 3-v-f sources, which can accept power, the synchronous-induction motor can operate as a generator for regenerative braking. Some aspects of such control capabilities can be seen in the chart of FIG. 2.

The speed $\omega_m$ of the output shaft shown at 20 in FIG. 1 is equal to the algebraic sum of the stator excitation frequency and the rotor excitation frequency. As indicated in FIG. 2, there are three combinations of excitations that will allow the motor to be at rest: Option A wherein the fields of both the stator and rotor are stationary; Option B wherein the fields of the stator and the rotor at the same speed in a clockwise direction; and Option C wherein both fields are rotating in a counter clockwise direction at the same speed. As indicated under Option B, one-half full speed in a forward direction can be obtained by keeping the rotor field at rest and rotating the stator field at full speed in the clockwise direction. Alternatively, under Option C, one-half forward speed can also be obtained by keeping the stator field stationary and rotating the rotor field in the counterclockwise direction. The reverse direction is obtained by reversing the rotational sense of the forward direction.

The system herein described makes use of the important fact that the amount of electrical power that is converted from the stator and rotor winding as mechanical power at the output shaft ($T\omega_m$), is proportional to the excitation frequencies. At full speed, for example, 50% of the output power is derived from the stator windings and 50% from the rotor windings. At one-half speed all the output power can be derived from either the stator winding (Option B) or from the rotor winding as shown under Option C. However, if desired, the output power at one-half speed, can still be shared equally by rotating the stator and rotor fields at one-half of their maximum rate but in the opposite sense, as is shown under Option A.

Figure 3:
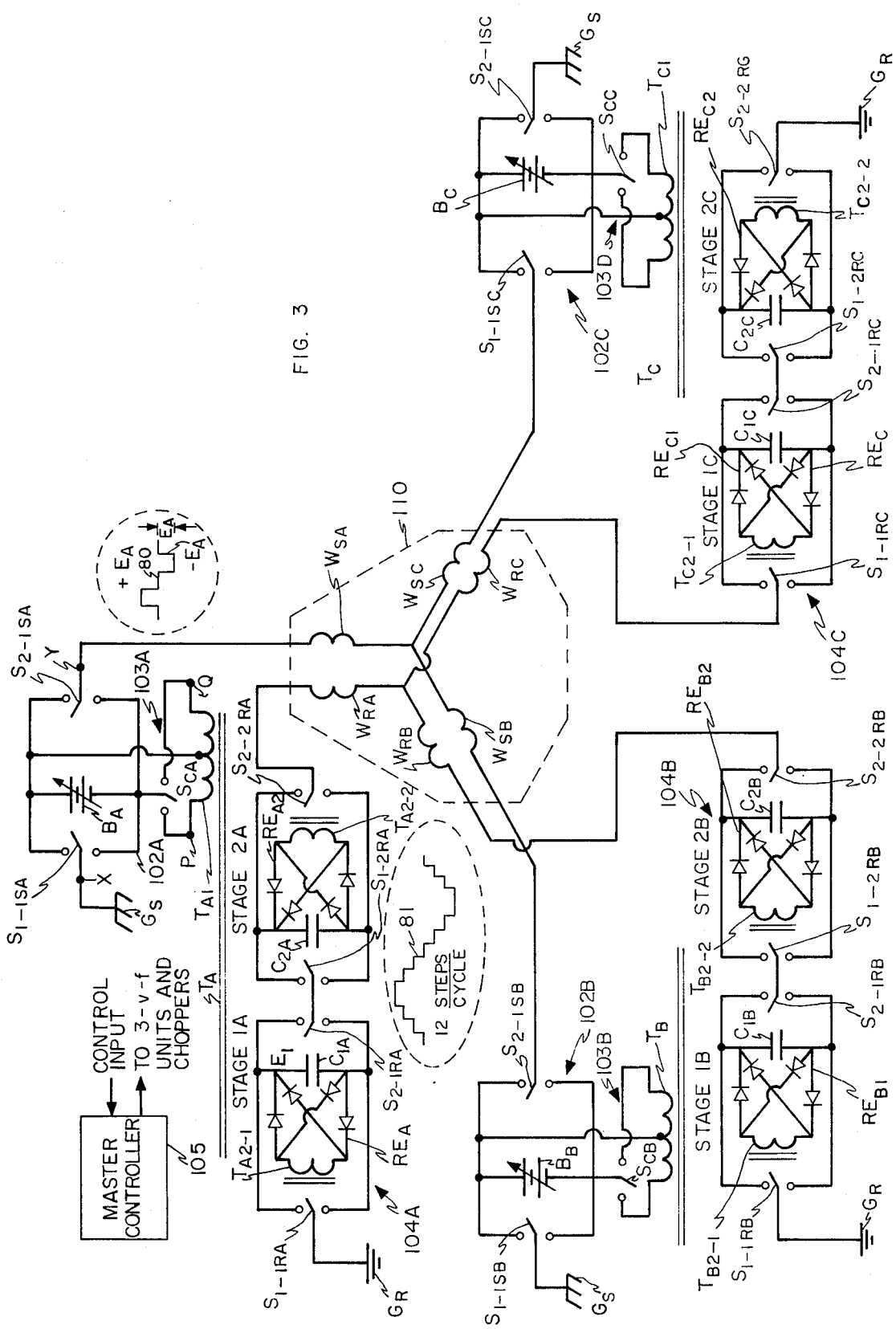
FIG. 3 is a schematic circuit diagram partly block diagram in form, showing detailed circuits for an embodiment of a machine of the type illustrated more generally in FIG. 1.

In FIG. 3 there is shown a particular embodiment of the control portion 113 to energize the wound rotor machine 110. The machine 110 is three-phase, as above noted. The stator and rotor sources 102 and 104 respectively, are shown in their detailed form comprising identical phase sources 102A, 102B and 102C (also called primary phase sources herein) and 104A, 104B and 104C (also called secondary phase sources herein). Examination of FIG. 3 will show that the elements that compose the primary phase sources 102B and 102C are marked like corresponding elements in the primary phase source 102A except for an appropriate change from use of the letter A to that of B or C as needed; hence, in the main, in the discussion that follows, reference is made to the primary phase source 102A only. Similar remarks apply to the rotor phase sources or secondary phase sources 104A. . . The three-phase chopper 103 is also made up of three identical units marked 103A, 103B and 103C in FIG. 3. A description of the chopper 103A . . . is a little complicated because some of those elements that interact to perform the chopping function overlap to perform interacting functions with associated stator and rotor sources. That cannot be helped but it is not believed any great confusion will result.

The output voltage wave of the stator phase source 102A is a square wave 80 whose amplitude is $E_A$, whose pulse width can be modified by appropriate signals from the master controller 105, and which can be combined with similar square waves from the phase sources 102B and 102C to give a three-phase input to the motor portion 110. The output voltage wave of the rotor phase source 104A is a step wave 81; the height and width of the voltage steps mixing up the wave 81 can be tailored to give an appropriate waveform in view of the waveform 80--to maintain harmonic content within reasonable limit, for example. Again, the waveform 81 is combined with like waveforms from the phase sources 104B and 104C.

The primary phase source 102A has an input and an output, the input and output being marked X and Y without further designation as to which applies to which since, as is explained in said application, Ser. No. 515,290, the role of each continually changes, but again, this should not confuse anyone. The single-stage source 102A includes DC primary supply voltage means $B_A$ shown as a variable voltage battery (see later explanation), first bilateral switch means $S_{1-1SA}$ and second bilateral switch means $S_{2-1SA}$. The first bilateral switch $S_{1-1SA}$ and the second bilateral switch $S_{2-1SA}$ are operable to connect the battery $B_A$ between the input and the output (i.e., X and Y) of the primary stage 102A such that when the input and the output of the primary stage are at equal potential or the output is positive with respect to the input or the output is negative with respect to the input (in the latter situation the roles change and to be precise, the input becomes the output and vice versa), thereby to provide the voltage wave 80 whose voltage and/or frequency can be varied.

The chopper 103A consists of a transformer $T_A$ having a center-tapped primary $T_{A1}$ connected to one side of the battery $B_A$ of the primary stage or primary phase source 102A and a chopper switch $S_{CA}$ connected between the other side of the battery $B_A$ and the end terminals marked P and Q of the transformer primary $T_{A1}$ to introduce to the transformer primary a series of electric pulses, as more fully discussed in said application entitled "Electric Power Supply." The secondary of the transformer comprises two secondary windings $T_{A2-1}$ and $T_{A2-2}$ each feeding a single stage of a two-stage chain, stage 1A and stage 2A, which forms the secondary phase source 104A. The stages 1A and 2A, which are connected in cascade, receive the transformed pulse output of the transformer $T_A$ and interact to form the twelve-step per cycle voltage wave 81 that is connected to the phase coil $W_{RA}$ of the rotor, as now explained.

The stages 1A and 2A include rectifying means $RE_{A1}$ and $RE_{A2}$ that comprises four diodes connected as shown to provide full-wave rectification of the output of the transformer secondaries $T_{A2-1}$ and $T_{A2-2}$. DC secondary supply voltage means in each stage is shown as capacitances $C_{1A}$ and $C_{2A}$ in stage 1A and stage 2A, respectively. The respective stages 1A and 2A further include further first bilateral switched $S_{1-1RA}$ and $S_{1-2RA}$ and further second bilateral switches $S_{2-1RA}$ and $S_{2-2RA}$ which interact to connect the capacitances $C_{1A}$ and $C_{1B}$ between the input and the output of the respective stage such that the input and the output of the particular secondary stage are at equal potential or the output is positive with respect to the input or the output is negative with respect to the input, as before. It should be appreciated at this juncture that the primary phase sources 102A . . . and the secondary phase sources 104A . . . can include N stages appropriately interconnected to give a desired output voltage waveform.

A number of different circuit elements can be used to effect changes in the output voltage waveforms 80 and 81. The width of the pulses that form the voltage wave 80 and the frequency thereof can be changed, for example, by modifying the switching sequence time of the switches $S_{1-1SA}$ and $S_{2-1SA}$; the voltage $E_A$ can also be modified, as later explained herein. Similarly, the width of the pulses making up the steps of the voltage wave 81 and the frequency thereof are determined by the timing sequence used for the switch $S_{1-1RA}$, etc. The chopper is sometimes gated ON and OFF to interrupt power flow from the primary source to the secondary source. The amplitude of the voltage 81 can be modified up or down by effecting changes in the output of the variable-voltage DC source $B_A$ or by making the secondary DC sources $C_{1A}$ and $C_{2A}$ variable in the manner later explained herein.

It should be apparent on the basis of what has been said herein, that the timing of the various switching functions is of critical importance to proper operation of the apparatus disclosed; such timing serves, among other things, to regulate the timing of the voltages applied to the stator and rotor windings as well as the time phase angle between the two, as above mentioned. Such timing is provided by the master controller through appropriate trigger circuitry which can be incorporated in the controller or be seprated therefrom. Triggering can be accomplished by flip-flop circuits or other well-known circuitry.

The actual controlling or directing functions can be effected by a microprocessor that includes (as is well known to workers in this art) a clock, flip-flops, gates and other assorted circuitry interconnected to perform standard data processing functions such as, for example, signal gating and formatting, time sequence generation, code selection, etc.: see for example, basic logic circuits in the text, "Analog-to-Digital/Digital-to-Analog Conversion Techniques," (David F. Hoeschele, Jr., John Wiley & Sons, Inc., 1968); "Digital Computer Fundamentals" (Thomas C. Bartel, McGraw-Hill Book Company, Inc., 1960); and many articles in trade journals, for example, *Electronics,* Nov. 8, 1973, and other issues. Controller functions can be attained by using standard microprocessor units readily available in chip form from many manufacturers.

Figure 4A:
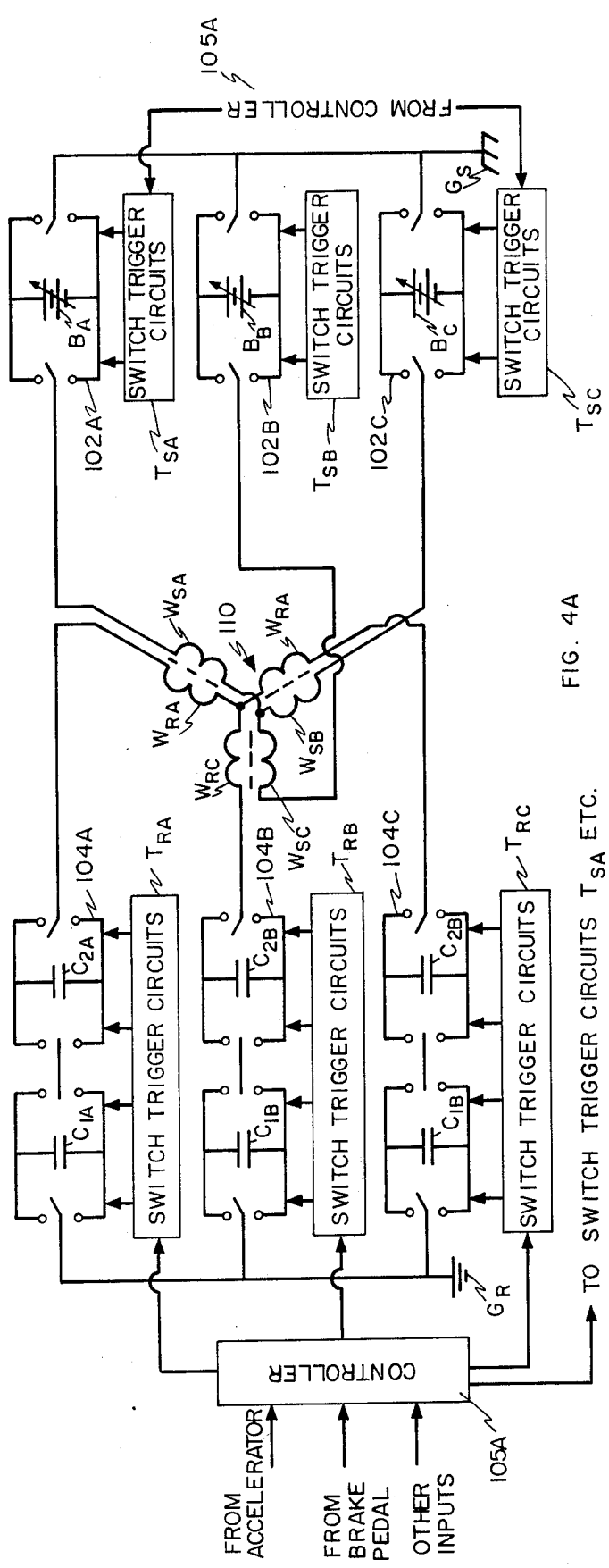
FIG. 4A is a schematic circuit diagram, partly block diagram in form, showing the apparatus of FIG. 3 with switching circuitry shown in some detail but with other circuit elements omitted to reduce the complexity of the figure.

More specifically, as shown in FIG. 4A, the master controller 105 includes rotor switch trigger circuits $T_{RA}$ . . . and stator switch trigger circuits $T_{SA}$ . . . as well as a controller 105A to regulate operation of the trigger circuits. The controller 105A is a digital processes that accepts information from the motor about its speed, for example, as well as information from the vehicle brake pedal and accelerator; it processes the information and forms control signals which are sent to the switch trigger circuits $T_{RA}$ . . . and $T_{SA}$ . . . The switch trigger circuits serve to establish the conductive state of the first and second bilateral switches in the 3-v-f stages. In this way the frequency of the rotor and stator excitations are regulated; in this way, among other things, the time phase between the rotor and stator fields is regulated to control torque, e.g., during acceleration and regenerative braking. The controller 105A also commands appropriate trigger circuits to establish the conductive state of the various switches in FIG. 6 to provide an appropriate stage voltage for both the rotor and the stator, as later discussed.

Figure 4B:
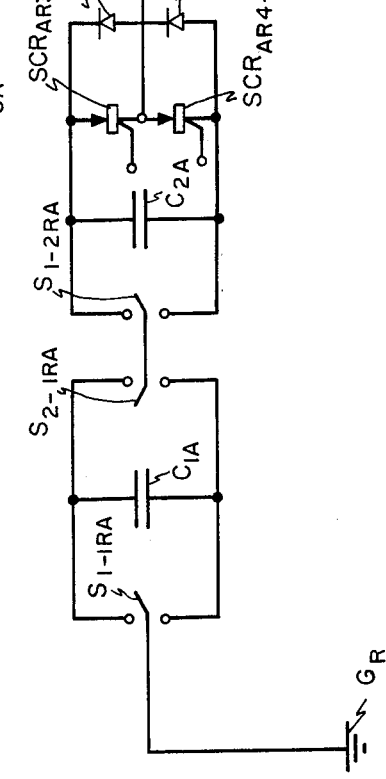
FIG. 4B is a schematic circuit diagram showing one form of switch that may be used in the previously described circuits and a scheme for implementing switching thereof.

The commutation circuit in FIG. 4B is now explained. In FIG. 4B there is shown circuitry to effect commutation (i.e., switching) of thyristors that can perform the switching function in the switches $S_{1-1SA}$ . . ., $S_{1-1RA}$ . . ., $S_{CA}$ . . ., as well as the switches in FIG. 6. In FIG. 4B, one phase, phase A, of the system of FIG. 3 is shown. The function of the first bilateral switch $S_{1-1SA}$ in FIG. 3 is performed by thyristors $SCR_{AS1}$, $SCR_{AS2}$ and diodes $D_{AS1}$ and $D_{AS2}$, in combination, as is discussed in great detail in said application 360,501 and others; similarly, the function of the second bilateral switch $S_{1-2SA}$ is performed by thyristor $SCR_{AS3}$, $SCR_{AS4}$ and diodes $D_{AS3}$ and $D_{AS4}$. The function of the switch $S_{2-2RA}$ is performed by thyristors $SCR_{AR3-2}$ and $SCR_{AR4-2}$ and diodes $D_{AR3-2}$ and $D_{AR4-2}$. The further switches and other stage elements in FIG. 4B are marked as in FIG. 3. The actual commutation is effected by a commutation voltage 82 comprising a positive pulse 82A and a negative pulse 82B, as discussed in the next paragraph.

In order to turn OFF a thyristor that is ON, i.e., conducting, the current through it must be brought to zero (or made to flow in the reverse or opposite direction in the device) for a length of time sufficient for the thyristor to become non-conducting. The thyristors in FIG. 4B can be commutated OFF by introducing the positive pulse 82A or the negative phase 82B depending upon which thyristors are to be rendered non-conducting. The bipolar commutation voltage 82 is generated at the secondary of a transformer $T_{XA}$ whose primary is pulsed by interaction of thyristors $SCR_{XA1}$ and $SCR_{XA2}$ which switch electric current to the primary from a battery $B_{XA}$. The system shown permits commutation of all the thyristors in the primary stage, thyristors $SCR_{AS1}$ . . . $SCR_{AS4}$; a similar arrangement can be used for the thyristors in the rotor circuit as well as for other switches in the system. A capacitor $C_x$ serves as a commutation capacitor.

Figure 5:
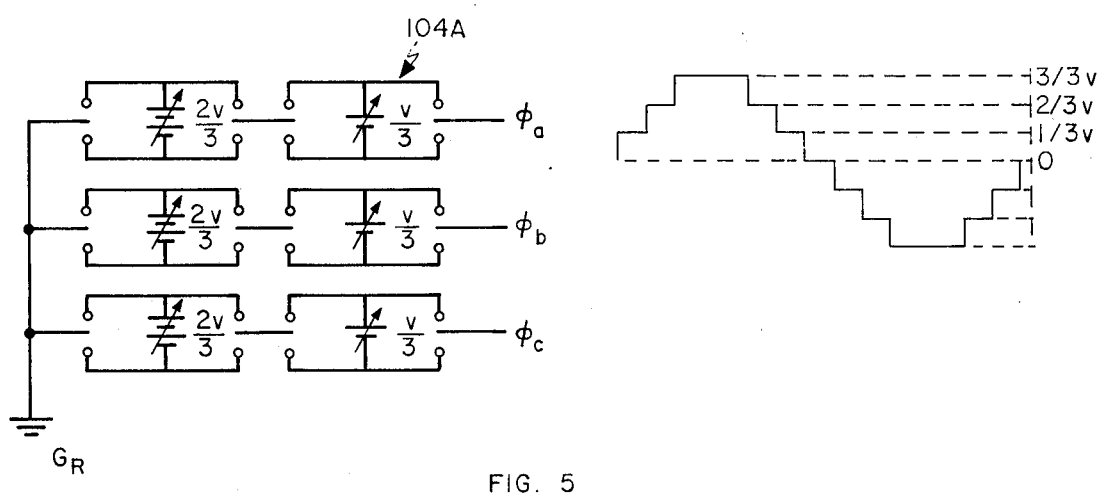
FIG. 5 shows schematically circuitry that may be used to replace some of the circuitry of FIG. 3.
Figure 6:
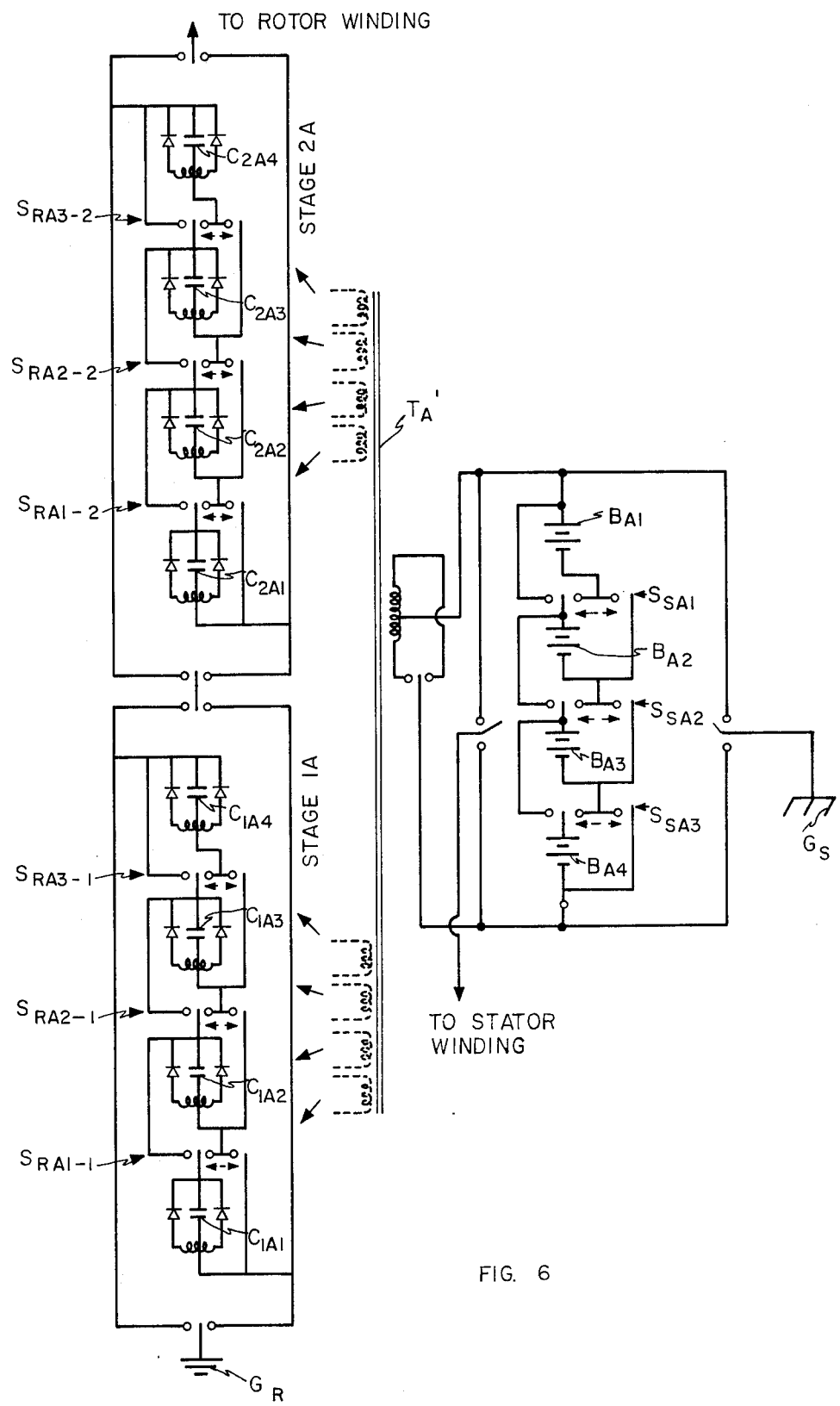
FIG. 6 is a schematic circuit diagram of circuitry that can be used to vary the amplitude of the voltage waveforms on both the stator and the rotor windings.

The voltage delivered to both the rotor and the stator can be arrived at using batteries as shown in the circuit 104A in FIG. 5 and the batteries can be single voltage packages or variable voltage arrangements as shown in FIG. 6; see also said application Ser. No. 515,290.

The circuitry of FIG. 6 again represents one phase of a three-phase system like that of FIG. 3; let it again be assumed to be the A phase. The variable voltage battery $B_A$ of FIG. 3 is shown in FIG. 6 comprising a plurality of batteries $B_{A1}$ . . . $B_{A4}$ which are switched from parallel to series configurations by switches $S_{SA1}$ . . . $S_{SA3}$ under the control of the master controller 105 and as described in said application Ser. No. 515,290. The capacitances $C_{1A}$ and $C_{2A}$ which are also variable voltage elements are composed respectively of capacitances $C_{1A1}$ . . . $C_{1A4}$ and $C_{2A1}$ . . . $C_{2A4}$. The switching necessary to give the required parallel and series connections for various voltages is accomplished by switches $S_{RA1-1}$ . . . $S_{RA3-1}$ as to stage 1A and $S_{RA1-2}$ . . . $S_{RA3-2}$ as to stage 2A-- again in the manner described in said application Ser. No. 515,290. The transformer marked $T_A'$ in FIG. 6 has one primary and eight secondaries. The use of capacitances in stages 1A and 2A in FIG. 6 permits size reductions and system flexibility not available in the system of the earlier application.

The electronic motor above described has several significant advantages as to requirements wherein variable speed and variable torque are needed. Thus, there is supplied large starting torque by a small machine; the torque in a synchronous-induction machine is derived from two sets of windings and consequently, like a motor and unlike an induction motor, the torque increases when the current through a winding is increased even though the machine's magnetic paths are saturated. It is possible to phase the stator and rotor excitations (i.e., the axes of the magnetic fields at an optimal electrical displacement) so that a synchronous-induction motor can operate with minimum current per unit torque over its entire speed range. (This is equivalent to adjusting the spring tension which couples the rotor to the stator in the mechanical analog of the synchronous machine, W. H. Erickson and N. H. Bryant, Electrical Engineering Theory and Practice, John Whiley & Sons, Inc., 1952, 2nd Edition, Chapter 16.) A motor having the foregoing characteristics operates synchronously (with zero slip). Accordingly, the speed and torque control is precise. This means that a plurality of machines can be accurately coordinated.

It can now be seen on the basis of the above explanation that the rotating electric machine herein disclosed has advantages also in situations slightly removed from the above. Thus, one winding of the wound rotor machine 101 in FIG. 1 can be energized by a three-phase, variable frequency, variable voltage supply, that is, either the rotor or the stator winding can be so energized. Let it be assumed that it is the rotor winding 115 that is so energized and that the rotor is caused to rotate by introducing mechanical energy through the shaft 20. Now a voltage can be derived from the stator winding 114 and the frequency thereof can be made independent of rotor speed, and, within limits, so can the voltage output. Both voltage and frequency of a machine can be controlled by the master controller 105 on the basis of appropriate feedback signals from the machine output or from a driven load circuit or the like. Or the machine 101 can be operated in a mode wherein, say, the stator frequency is fixed at some magnitude and the variable speed characteristics can be brought about by varying the rotor frequency., Typically the apparatus herein contemplates a rotating electric machine wherein the rotor is coaxial with and nested within the stator; but the concepts disclosed hve use in so-called "pancake" designs, linear motors and other rotor-armature configurations as well. Inthe foregoing description, the terms $G_S$ and $G_R$ designate common stator and common rotor connections, respectively.

Modifications of the invention herein described will occur to persons skilled in the art and all such modifications are deemed to be within the spirit and scope of the invention as defined by the appended claims.

What is claimed is:

1. Electric apparatus having two sets of polyphase coils magnetically coupled and adapted to move relative to one another; a first variable voltage, variable frequency, polyphase source connected to energize one set of the polyphase coils; a second variable voltage, variable frequency, polyphase source connected to energize the other set of the polyphase coils; means to vary the voltage and the frequency of the first polyphase source over a wide range of voltages and frequencies; means to vary the voltage and the frequency of the second polyphase source over a wide range of voltages and frequencies; and means to control the time phasing of the output of the second polyphase source relative to the first polyphase source; relative movement between the two sets of polyphase coils being between zero and some maximum value; each phase of the first polyphase source comprising a primay stage having an input and an output and including DC primary supply voltage means, first bilateral switch means and second bilateral switch means, the first bilateral switch means and the second bilateral switch means being operable to connect the DC primary supply voltage means between the input and the output of the primary stage such that the input and the output of the primary stage are at equal potential or the output is positive with respect to the input or the output is negative with respect to the input.

2. Apparatus as claimed in claim 1 having a stator and a rotor coaxial with and nested within the stator, one set of the polyphase coils being on the stator and the other set of the polyphase coils being on the rotor, said rotor having slip rings to allow connection to the rotor coils, said relative movement being from stall-to-maximum speed.

3. Apparatus as claimed in claim 1 in which each phase includes: a center-tapped primary of a transformer connected to one side of the DC primary supply voltage means of the primary stage, a chopper switch connected between the other side of the DC primary supply voltage means and the end terminals of said primary of the transformer to introduce to the transformer primary a series of electric pulses, rectifying means connected to receive the output of the transformer secondary and operable to rectify the same, DC secondary supply voltage means connected to receive the rectified output of the transformer secondary, the rectifying means and the DC secondary supply voltage means forming part of a secndary stage having an input and an output and that also includes further first bilateral switch means and further second bilateral means, the bilateral switch means of the secondary stage acting in concert to connect the DC secondary supply voltage means between the input and the output of the secondary stage such that the input and the output of the secondary stage are at equal potential or the output is positive with respect to the input or the output is negative with respect to the input.

4. Apparatus as claimed in claim 3 in which the secondary of the transformer comprises two secondary windings, the apparatus including two secondary stages as defined in claim 5 connected in cascade.

5. Apparatus as claimed in claim 3 that further includes control means to control the state of the first bilateral switch means and the second bilateral switch means of both the primary stage and the secondary stage as well as the chopper switch, the control means acting with respect to the chopper switch to control the chopping frequency and to gate the chopper switch ON and OFF.

6. Apparatus as claimed in claim 5 in which the control means includes primary switch trigger circuits to control the states of the first bilateral switch means and the second bilateral switch means of the primary stage, secondary switch trigger circuits to control the state of the further first bilateral switch means and the further second bilateral switch means of the secondary stage, and controller means to control all the named switch trigger circuits, thereby controlling independently the frequency and phase of electric potential impressed on each phase of each set of the polyphase winding.

7. Apparatus as claimed in claim 6 in which the DC primary supply voltage means is a variable-voltage DC supply and in which the DC secondary supply voltage means is a variable voltage DC supply, thereby to provide a variable primary voltage and to provide, therefore, a variable secondary voltage, since the latter is derived from the primary voltage, and to provide, as well, a secondary voltage which is independently variable even further in its own right.

8. A variable speed electric rotating machine that comprises, in combination: a wound polyphase stator winding; a wound polyphase rotor winding, the rotor being adapted to receive mechanical energy in a generating mode of operation; variable voltge, variable frequency polyphase source means connected to energize one winding only of the machine; control means connected to control the polyphase source means, said control means acting to establish both the voltage output and the frequency output of the source means on the basis of a schedule whereby the machine, in said generating mode of operation, can generte electric energy by induction in the winding not energized by said source means at regulated frequency and voltage; and feedback means connected as input to the control means to permit regulation of the machine output voltage and/or frequency in a determined fashion over a fashion over a wide range of speeds that vary from stall-to-maximum speed; each phase of the polyphase source means comprising a stage having an input and an output and including variable voltage DC supply voltage means, first bilateral switch means, and second bilateral switch means, the first bilateral switch means and the second bilateral switch means being operable to connect the variable voltge DC supply voltage means between the input and the output of the stage such tht the input and the output of the stage can be at equal potential or the output can be positive with repect to the input or the output can be negative with respect to the input.

9. A variable speed electric rotating machine that comprises, in combination: a wound polyphase stator winding; a wound polyphase rotor winding, the rotor being adapted to receive mechanical energy in a generating mode of operation; variable voltge, a variable frequency polyphase source means connected to energize one winding only of the machine; control means connected to control the polyphase source means, said control means acting to establish both the voltage output and the frequency output of the source means on the basis of a schedule whereby the machine, in said generating mode of operation, can generate electric energy by induction in the winding not energized by said source means at regulated frequency and voltage; and feedback means connected as input to the control means to permit regulation of the machine output voltage and/or frequency in a determined fashion over a wide range of speeds that vary from stall-to-maximum speed; each phase of the polyphase source means comprising a plurality of stages connected in cascade, each stage having an input and an output and including variable voltage DC supply voltage means, first bilateral switch means and second bilateral switch means, the first bilateral switch means and the second bilateral means being operable to connect the variable voltage DC supply voltage means between the input and the output of the stage such that the input and the output of the stage are at equal potential or the output is positive with respect to the input or the output is negative with respect to the input.

10. Apparatus as claimed in claim 9 having a DC source of electric potential and in which each phase includes: a centertapped primary of a transformer connected to one side of the DC source of electric potential, a chopper switch connected between the other side of the DC source of electric potential and the end terminals of said primary of the transformer and operable to introduce to the transformer primary a series of high freuency electric pulses, rectifying means connected to receive the output of the transformer secondary and operable to rectify the same, the DC supply voltage being connected to receive the rectified output of the transformer secondary.

11. Apparatus as claimed in claim 10 that further includes control means to control the conductive state of the first bilateral switch means and the second bilateral switch means as well as the chopper switch, the control means acting with respect to the chopper switch to control the chopping frequency and to gate the chopper switch ON and OFF.

12. Apparatus as claimed in claim 11 in which the control means includes switch trigger circuits to control the conductive state of the first bilateral switch means and the second bilateral switch means and controller means to regulate operation of the switch trigger circuits, thereby controlling the frequency and the voltage impressed on said at least one winding.

13. A variable speed electronic motor comprising, in combination: a wound polyphase stator winding adapted to be energized by a polyphase source; a wound polyphase rotor winding adapted to be energized by a polyphase source; variable voltage, variable frequency polyphase source means connected to energize both the stator winding and the rotor winding; and digital control means that acts to control the angular velocity of the motor over a wide range of speeds from stall-to-maximum speed by regulating the frequency of the variable voltage, variable frequency polyphase source means, said digital control means further acting to control the voltage over a wide range of voltages, there being feedback from the rotor to the digital control means to provide appropriate feedback signals for frequency and voltage control; each phase of the polyphase source means comprising a stage having an input and an output and including variable-voltage DC supply voltage means, first bilateral switch means, and second bilateral switch means, the first bilateral switch means and the second bilateral switch means being operable to connect the variable voltage supply voltage means between the input and the output of the stage such that the input and the output of the stage can be at equal potential or the ourput can be positive with respect to the input or the output can be negative with respect to the input.

14. A variable speed electronic motor comprising, in combination: a wound polyphase stator winding adapted to be energized by a polyphase source; a wound polyphase rotor winding adapted to be energized by a polyphase source; variable voltage, variable frequency polyphase source means connected to energize both the stator winding and the rotor winding; and digital control means that acts to control the angular velocity of the motor over a wide range of speeds from stall-to-maximum speed by regulating the frequency of the variable voltage, variable frequency polyphase source means, said digital control means further acting to control the voltage over a wide range of voltages, there being feedback from the rotor to the digital control means to provide appropriate feedback signals for frequency and voltage control; each phase of the polyphase source means comprising a plurality of stages connected in cascade, said stage having an input and an output and including DC supply voltage means, first bilateral switch means and second bilateral switch means, the first bilateral switch means and the second bilateral switch means being operable to connect the DC supply voltage means of each stage between the input and the output of the stage such that the input and the output of the stage are at equal potential or the output is positive with respect to the input or the output is negative with respect to the input.

15. Apparatus as claimed in claim 14 having a DC source of electric potential and in which each phase includes: a centertapped primary of a transformer connected to one side of the DC source of electric potential, a chopper switch connected between the other side of the DC source of electric potential and the end terminals of said primary of the transformer and operable to introduce to the transformer primary a series high frequency electric pulses, rectifying means connected to receive the output of the transformer secondary and operable to rectify the same, the DC supply voltage means being connected to receive the rectified output of the transformer secondary.

16. Apparatus as claimed in claim 15 that further includes control means to control the conductive state of the first bilateral switch means and the second bilateral switch means as well as the chopper switch, the control means acting with respect to the chopper switch to control the chopping frequency and to gate the chopper switch ON and OFF.

17. Apparatus as claimed in claim 16 in which the control means includes switch trigger circuits to control the conductive state of the first bilateral switch means and the second bilateral switch means and controller means to regulate operation of the switch trigger circuits, thereby controlling the frequency and the voltage impressed on said stator winding and on said rotor winding.

18. A variable speed electronic motor comprising, in combination: a wound polyphase stator winding adapted to be energized by a polyphase source; a wound polyphase rotor adapted to be energized by a polyphase source; first polyphase source means connected to energize the polyphase stator winding; second polyphase source means connected to energize the rotor winding; the first polyphase source means and the second polyphase source means both being operable to apply a variable voltage and variable frequency to the respective winding to permit independent control of the magnetic fields of each, both as to frequency and as to field strength, to provide a variable speed motor whose speed is continuously variable from stall-to-maximum speed and to provide appropriate energy flow to the motor at each value of speed; means to control the first polyphase source means and the second polyphase source means to establish the voltage and frequency output of each, the first polyphase source means comprising a variable voltage DC source, the second polyphase source means also comprising a variable voltage DC source and wherein the voltage waves of each source means comprises a stepped voltage wave whose rms value is varied by effecting changes in the output of the variable voltage DC source.

19. A variable speed electronic motor comprising, in combination: a wound polyphase stator winding adapted to be energized by a polyphase source; a wound polyphase rotor adapted to be energized by a polyphase source; first polyphase source means connected to energize the polyphase stator winding; second polyphase source means connected to energize the rotor winding; the first polyphase source means and the second polyphase source means both being operable to apply a variable voltage and variable frequency to the respective winding to permit independent control of the magnetic fields of each, both as to frequency and as to field strength, to provide a variable speed motor whose speed is continuously variable from stall-to-maximum speed and to provide appropriate energy flow to the motor at each value of speed; means to control the first polyphase source means and the second polyphase source means to establish the voltage and frequency output of each, the first polyphase source means and the second polyphase source means each comprising a polyphase source whose output is a stepped waveform and wherein both the means to control the first polyphase source means and the second polyphase source means is operable to control the widths of the pulses or steps in each said waveform and hence the rms voltage applied to each said winding.

20. An electronic motor comprising, in combination: a wound polyphase winding; variable voltage, variable frequency polyphase source means connected to energize said polyphase winding to provide a variable speed motor whose speed is continuously variable from zero to some maximum speed and to provide appropriate energy flow to the motor at each value of speed; and means to control the polyphase source means to establish the rms voltage and frequency output thereof, the output of the polyphase source means being a polyphse stepped waveform, said means to control being operable to control the widths of the pulses or steps making up the waveform to effect control of said energy flow at each value of speed.

21. An electronic motor as claimed in claim 20 wherein said polyphase winding is on the stator of the motor and wherein the rotor contains a further polyphase winding, and wherein further polyphase source means and means to control the same respectively like the polyphase source means and the means to control of claim 20, are provided to apply a stepped waveform comprising variable width pulses or steps to the rotor winding, the waveform applied to the stator winding and the waveform applied to the rotor winding being varied in both frequency and in rms voltage to effect variations in the speed of the motor and energy flow to the motor, respectively.

22. A rotating electronic machine comprising, in combination: a wound polyphase winding; and a power conditioner connected to the polyphase winding and operable to process electric energy so as to control the flow of electric energy between the polyphase winding and the power conditioner, said power conditioner comprising variable voltage, variable frequency polyphase source means connected to said polyphase winding and control means that serves to establish the rms voltage and frequency of the source means, each phase of the polyphase source means including a stage that comprises a DC source and switch means operable to interconnect the DC source to the polyphase winding, the control means being operable to sequence the switch means in a predetermined pattern to establish a voltage wave pattern comprising pulses or steps and wherein the control means is programmed to effect changes in the pulse width of the pulses or steps to effect changes in the rms value of the voltage wave over a wide range from zero to some maximum value.

23. A rotating electronic machine as claimed in claim 22 wherein said control means comprises digital logic.

24. A rotating electric machine as claimed in claim 23 in which said winding is the stator winding of a polyphase motor and wherein the digital logic is operable to control the switch means to vary the frequency of the voltage wave to vary the speed of the motor from stall-to-maximum speed and to vary the widths of the pulses or steps at each value of speed and hence the electric energy flow to the motor at each value of speed.

25. A rotating electric machine as claimed in claim 23 in which said winding is the stator winding of a polyphase electric generator, wherein said DC source comprises electric battery means that is connected to receive electric energy from the polyphase electric generator in a charging mode, and wherein the digital logic is operable to control the switch means to vary at least one of the frequency of the voltage wave and the rms voltage thereof so that, in said charging mode, the battery means can accept electric energy over a range of frequencies and so that the rate at which electric energy flows to the battery means can be controlled.

26. A rotating electric machine as claimed in claim 23 in which said winding is the stator winding of a rotating electric machine, in which the rotating electric machine is operable to perform a motor function and a generator function, said power conditioner comprising electric storage battery mans that serves to receive and store electric energy when the rotating electric machine is performing its generator function and to deliver electric energy to the rotating electric machine when the machine is performing its motor function, the digital logic being operable to control the switch means to vary the voltage wave of the power conditioner to control the frequency of said voltage wave and the rms voltage of said voltage wave and hence affect the energy flow between the rotating electric machine and the power conditioner during the course of both motor function and the generator function and over a range of speeds of the rotating electric machine that varies from stall-to-maximum speed.

27. A rotating electronic machine that comprises, in combination: a rotating electric machine having a wound armature winding and a field; and electric power conditioner means connected to apply a variable voltage variable frequency AC waveform to said winding, said waveform being a stepped waveform, said electric power conditioner means comprising DC source means and switch means operable to interconnect the DC source means to said winding to apply said AC waveform thereto, said power conditioner means further comprising digital logic means connected to the switch means to control the frequency of the AC waveform to control the speed of the rotating electric machine from stall-to-maximum speed in a motoring mode of operation and to modify the width of the pulses that form the stepped waveform to control electric energy flow between said electric power conditioner and said winding as the speed of the rotating electric machine varies from said stall-to-maximum speed.

28. A rotating electronic machine as claimed in claim 27 wherein the rotating electric machine is also adapted to operate in a generating mode, wherein the DC source means comprises electric storage battery means that serves to receive and store electric energy in the course of said generating mode and over a speed range of the rotating electric machine from just above stall-to-maximum speed, and wherein the digital logic means is operable to effect appropriate switching of the switch means to control the electric energy flow over said speed range in the generating mode 29. A rotating electronic machine that comprises, in combination: a variable speed rotating electric machine having a wound armature winding and a field winding, the speed of the rotating electric machine being variable from stall-to-maximum speed; and electric power conditioner means operable to provide at its terminals a stepped voltage waveform whose frequency and rms voltage are both variable over a wide range, said terminals being connected to said winding, said electric power conditioner comprising DC source means, switch means and digital logic means that act in combination to vary said frequency and said rms voltage to control energy flow between the variable speed rotating electric machine and the electric power conditioner means at each speed of the various speeds between stall and maximum speed.

30. A rotating electronic machine as claimed in claim 29 in which said energy flow, over the wide range of speeds between stall and maximum speed, is controlled by effecting changes in the width of the steps or pulses forming the stepped voltage waveform and in which the digital logic means controls the switch means to effect appropriate changes in said width.

31. A rotating electronic machine as claimed in claim 30 wherein the DC source means comprises battery means and capacitors in interconnected combination.

* * * * *